United States Patent Office 3,178,424
Patented Apr. 13, 1965

3,178,424
BENZOTHIADIAZINE-1,1-DIOXIDES
George de Stevens, New Providence, and Lincoln Harvey Werner, Summit, N.J., assignors to Ciba Corporation, a corporation of Delaware
No Drawing. Filed Nov. 30, 1960, Ser. No. 72,553
4 Claims. (Cl. 260—243)

The present invention relates to 3,4-dihydro-2H-1,2,4-benzothiadiazine-1,1-dioxides of the formula:

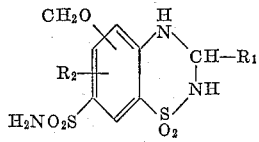

in which $R_1$ represents dichloromethyl, benzyl, 1-phenylethyl, cycloalkyl-methyl or 1-cycloalkyl-ethyl, and $R_2$ represents chloro or trifluoromethyl, salts of such compounds with alkali metals, as well as procedure for the preparation thereof.

The cycloalkyl portion in a cycloalkyl-methyl or a 1-cycloalkyl-ethyl radical $R_1$ contains from three to eight ring carbon atoms and may be represented by cyclopropyl, cyclobutyl, cycloheptyl or cyclo-octyl, but contains more preferably from five to six ring carbon atoms and stands for cyclopentyl or cyclohexyl. Such cycloalkyl-methyl and 1-cycloalkyl-ethyl groups representing $R_1$ may, therefore, stand for cyclopropylmethyl, cyclobutylmethyl, 1-cyclobutylethyl, cycloheptylmethyl, cyclooctylmethyl and the like, but more particularly for cyclopentylmethyl, 1-cyclopentylethyl, cyclohexylmethyl or 1-cyclohexylethyl.

Salts with alkali metals are primarily those with sodium, potassium and the like.

The compounds of the present invention have diuretic and saliuretic, particularly natriuretic, properties and are intended to be used as diuretic or saliuretic, particularly natriuretic, agents having improved and outstanding properties to relieve conditions of excessive water and salt retention as, for example, caused by kidney or heart ailments. Coupled with the diuretic and saliuretic activities of the present compounds is a strong antihypertensive effect, which renders the compounds especially useful as antihypertensive medicaments in hypertensive conditions, which are coupled with water and salt retention, such as, for example, in heart ailments and the like.

Particularly outstanding diuretic and saliuretic effects are shown by compounds of the formula:

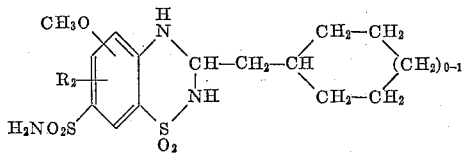

in which $R_2$ stands for chloro or trifluoromethyl.

The new compounds of this invention may be used as medicaments in the form of pharmaceutical preparations, which contain the new 3,4-dihydro-2H-1,2,4-benzothiadiazine-1,1-dioxide compounds or salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in solid form, for example, as capsules, tablets, dragees and the like, or in liquid form, for example, as solution, suspensions, emulsions and the like. If desired, they may contain auxiliary substances such as preserving agents, stabilizing agents, wetting or emulsifying agents, salts for varying the osmotic pressure or buffers. They may also contain, in combination, other therapeutically useful substances; particularly useful are antihypertensive compounds, such as Rauwolfia alkaloids, e.g. reserpine, rescinnamine or deserpidine, semisynthetic Rauwolfia alkaloids, e.g. syrosingopine and the like, Veratrum alkaloids, e.g. germine, protoveratrine and the like, synthetic antihypertensive compounds, e.g. hydralazine, dihydralazine and the like, or ganglionic blockers, a.g. chlorisondamine and the like.

The compounds of the present invention may be prepared according to methods which are known in themselves.

For example, the compounds of the present invention may be prepared by reacting an aniline compound of the formula:

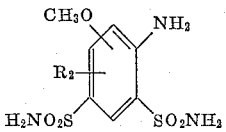

in which $R_2$ has the previously-given meaning, with an aldehyde of the formula $R_1$—CHO, in which $R_1$ has the above-given meaning, or a reactive derivative thereof, and, if desired, converting a resulting salt into the free compound, and/or, if desired, converting a free compound into a salt thereof.

The above reaction may advantageously be carried out in the presence of a small amount of an acid, for example, a mineral acid, e.g. hydrochloric, hydrobromic acid, sulfuric acid and the like, if desired, in anhydrous form. An acid may be necessary, whenever the aldehyde is employed in the form of a reactive derivative, such as an acetal, thereof. It may also be performed in the absence of a condensing reagent, or in the presence of a base, such as an alkali metal hydroxide, e.g. lithium hydroxide, sodium hydroxide, potassium hydroxide and the like, whereby the aldehyde is used in its reactive form. As mentioned above, the aldehyde may also be given into the reaction medium in a form which yields the desired reactant in situ. Thus, for example, an acetal of an aldehyde of the formula $R_1$—CHO with a lower alkanol, for example, methanol, ethanol and the like, may be used in the presence of a mineral acid; such acetals are, for example, 2,2-dichloro-1,1-diethoxy-ethane, 1,1-diethoxy-2-phenyl-ethane, 2-cyclopentyl-1,1-diethoxy-ethane and the like. Reactive derivatives of the above-mentioned aldehydes are also their alkali metal bisulfite, particularly sodium bisulfite, addition compounds.

The reaction is preferably carried out in the presence of a solvent, for example, an ether, e.g. p-dioxane, diethyleneglycol dimethylether and the like, a lower alkanol, e.g. methanol, ethanol and the like, a lower alkanone, e.g. acetone and the like, a formamide, e.g. N,N-dimethylformamide and the like, an aqueous mixture of such solvents, water or any other suitable solvent. It is preferably completed at an elevated temperature, for example, on a steam bath or at the boiling temperature of the solvent and, if necessary, the reaction may be performed under increased pressure or in the atmosphere of an inert gas, e.g. nitrogen.

The starting materials used in the above reaction may be prepared according to known procedures.

The resulting products may be obtained in the form of the free compounds or as salts thereof. A metal, particularly an alkali metal, salt may be converted into the free compound by treatment with an aqueous acidic reagent, such as a mineral acid, e.g. hydrochloric, sulfuric acid and the like. A free compound may be converted into an alkali metal salt, for example by treatment with an alkali metal hydroxide, e.g. sodium or potassium hydroxide, in a solvent, such as in a lower alkanol, e.g. methanol, ethanol and the like, or in water, and evaporating the solvent. Mono- or poly-salts may be obtained.

Any resulting racemate may be converted into the antipodes thereof according to methods used for resolving racemates.

The invention also comprises any modification of the process wherein a compound obtainable as an intermediate at any state of the process is used as starting material and the remaining step(s) of the process is(are) carried out, as well as any new intermediates.

In the process of this invention such starting materials are preferably used which lead to final products mentioned in the beginning as preferred embodiments of the invention.

This application is a continuation-in-part application of our application Serial No. 764,482, filed September 29, 1958, which in turn is a continuation-in-part application of our application Serial No. 751,620, filed July 29, 1958 (now abandoned), which in turn is a continuation-in-part application of our application Serial No. 740,582, filed June 9, 1958 (now abandoned), which in turn is a continuation-in-part application of our application Serial No. 727,242, filed April 9, 1958 (now abandoned).

The following example illustrates the invention; it is not to be construed as being a limitation thereon. Temperatures are given in degrees centigrade.

*Example*

To a solution of 3.2 g. of 3-chloro-2,4-disulfamyl-6-methoxy-aniline in 25 ml. of ethanol and 6 ml. of water is added 2.6 g. of cyclopentylacetaldehyde sodium bisulfite addition compound, followed by 2.3 ml. of concentrated aqueous hydrochloric acid. The temperature is slowly raised to 55–60° and kept at that temperature for 1½ hours. The reaction mixture is then concentrated under reduced pressure to remove the organic solvent, water is added and the desired 8-chloro-3-cyclopentylmethyl-5-methoxy-7-sulfamyl-3,4-dihydro-2H-1,2,4-benzothiadiazine-1,1-dioxide is allowed to crystallize. It is purified by recrystallization from a mixture of methanol and water.

The starting material used in the above procedure is prepared as follows: A total of 31.5 g. of 3-chloro-6-methoxyaniline is slowly added while cooling to 150 ml. of chlorosulfonic acid. After the reaction mixture has been brought to room temperature, 141 g. of sodium chloride is slowly added and the reaction mixture is heated to 115–120° for three hours and then cooled. A mixture of ice and water is added, the crude 3-chloro-6-methoxyaniline 2,4-disulfonyl chloride is filtered off and taken up in diethylether. The organic solution is washed with water, dried and evaporated to dryness. The residue is extracted with 150 ml. of benzene at reflux temperature, the extract is concentrated under reduced pressure and the residue (23 g.) is treated with 69 ml. of concentrated aqueous ammonia at room temperature, followed by heating on the steam bath for one hour. Water is added to the reaction mixture, the crude 3-chloro-2,3-disulfamyl-6-methoxy-aniline is filtered off and repeatedly recrystallized from a 1:1-mixture of ethanol and water, M.P. 245–250°.

What is claimed is:

1. A member of the group consisting of compounds of the formula:

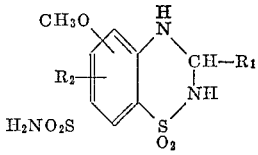

in which $R_1$ represents a member of the group consisting of dichloromethyl, benzyl, 1-phenylethyl, (cyclo-lower alkyl)-methyl and 1-(cyclo-lower alkyl)-ethyl, and $R_2$ stands for a member of the group consisting of chloro and trifluoromethyl, and alkali metal salts thereof.

2. A compound of the formula:

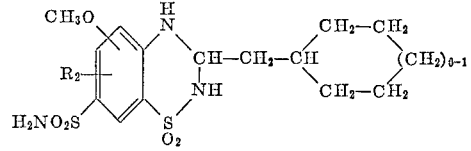

in which $R_2$ stands for chloro.

3. 8-chloro-3-cyclopentylmethyl-5-methoxy-7-sulfamyl-3,4-dihydro-2H-1,2,4-benzothiadiazine-1,1,-dioxide.

4. A compound of the formula

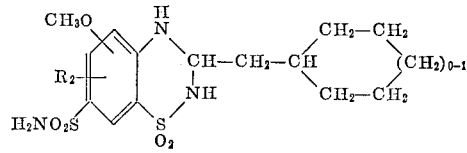

in which $R_2$ stands for trifluoromethyl.

References Cited by the Examiner

UNITED STATES PATENTS 2,809,194  10/57  Novello _____ 260—243

FOREIGN PATENTS 36,956  5/59  Luxembourg.

OTHER REFERENCES

Texas State Journal of Medicine, pages 854–859 (December 1958).

IRVING MARCUS, *Primary Examiner.*

NICHOLAS S. RIZZO, *Examiner.*